United States Patent [19]

Kleinerman

[11] 3,851,095

[45] Nov. 26, 1974

[54] COMMUNICATION SYSTEM FOR TRANSMITTING VIDEO INFORMATION THROUGH MEDIA OF RESTRICTED BANDWIDTH

[75] Inventor: Ben Kleinerman, New Hyde Park, N.Y.

[73] Assignee: Telescan Communications Systems, Inc., E. Meadow, N.Y.

[22] Filed: Aug. 7, 1972

[21] Appl. No.: 278,440

[52] U.S. Cl....... 178/6.8, 178/DIG. 3, 178/DIG. 24, 179/2 TV

[51] Int. Cl. .......................................... H04n 7/12

[58] Field of Search ........... 179/2 TV; 178/DIG. 3, 178/DIG. 24, 178/6.8

[56] References Cited

UNITED STATES PATENTS

| | | | |
|---|---|---|---|
| 2,103,847 | 12/1937 | Hansell | 332/17 |
| 2,833,958 | 5/1958 | Pensak | 178/DIG. 24 |
| 2,878,310 | 3/1959 | Becker | 179/2 TV |
| 2,895,005 | 7/1959 | Kock | 179/2 TV |
| 2,955,157 | 10/1960 | Young | 178/6.6 |
| 2,976,356 | 3/1961 | Fathauer | 179/2 TV |
| 3,061,670 | 10/1962 | Oster et al. | 179/2 TV |

*Primary Examiner*—Howard W. Britton
*Attorney, Agent, or Firm*—Kirschstein, Kirschstein, Ottinger & Frank

[57] ABSTRACT

A communication system for transmitting video information through media of restricted bandwidth. A camera, such as a standard TV fast scan camera can be used to convert an optical image to an electrical image. The output signal from the camera is fed to an amplifier which passes electrical information for one complete frame of a picture which is to be transmitted. The output of the amplifier is then received by a vidicon type storage tube and transmitted through narrow bandwidth transmission lines using slow scan TV techniques. The slow scan signal is received at a remote location and again stored on a Vidicon type storage tube. The slow scan image is then converted to a fast scan signal which is repetitiously displayed on a standard TV receiver.

5 Claims, 5 Drawing Figures

COMMUNICATION SYSTEM FOR TRANSMITTING VIDEO INFORMATION THROUGH MEDIA OF RESTRICTED BANDWIDTH

CROSS-REFERENCE TO RELATED APPLICATION

This application is an improvement of my copending U.S. application Ser. No. 242,946 filed on Apr. 11, 1972, for "SIMULTANEOUS TRANSMISSION OF A VIDEO AND AN AUDIO SIGNAL THROUGH A TRANSMISSION LINE."

BACKGROUND OF THE INVENTION

1. Field of the Invention

This invention relates to communication systems and more particularly to systems for transmitting video information through media of restricted bandwidth.

2. Brief Description of the Prior Art

Generally when transmitting video signals through media having narrow bandwidth, such as telephone lines, special techniques were necessary in order to be able to successfully transmit such video signals through the telephone lines, wherein these techniques required quite reduced bandwidths of for instance less than 2,500 Hz. However, when transmitting and receiving such slow scan images, the time required to transmit a complete frame or image may be as much as 8 seconds. Thus, as the latter portions of the picture are being received, the earlier received portions of the picture begin to fade, thereby not providing the most suitable technique for transmitting images through telephone lines. Furthermore, using standard slow scan techniques, an additional restriction is required for successful transmission of an image, this restriction being that the transmitted image must be of a stationary subject. If there is any significant movement of this subject, the transmitted image will be blurred and, depending upon the actual movement, may even be unrecognizable.

In order to obtain a still image which can be scanned and then transmitted, it has been suggested that a Polaroid camera be used, wherein the image is photographed, developed and then transmitted. However, using these techniques, the transmission becomes quite costly and time consuming since the price of taking and developing each picture is reasonably expensive and the time for properly setting up and selecting the image that one wants to transmit is often complicated, cumbersome and frustrating.

A further alternative technique which has been suggested is to use a fast scan camera which takes effectively a multitude of pictures, and transmits these pictures to a disc recorder, and then from the disc recorder slow scan signals would be transmitted. Unfortunately, the bandwidth of the fast scan camera is quite large, for instance 6 MHz thus requiring a great reduction of possibly 1,000 to 1 in the speed of the disc or tape recorder in order to transmit slow scan signals from the disc or tape recorder. Such a reduction in speed is quite a complex and cumbersome mechanical maneuver which puts an expensive and heavy burden on continuous performance of the system. Furthermore, there is no way of monitoring and selecting which images one wants to transmit in the first place and, effectively, a continuous stream of unselected and possibly redundant pictures would ultimately be transmitted. A more specific problem related to the disc or tape recorders results in the requirement of large quantities of tape being used, because of the necessity of an overall speed reduction.

SUMMARY OF THE INVENTION

1. Purposes of the Invention

It is therefore an object of this invention to provide a more convenient and reliable technique for selectively sending slow scanned images through narrow bandwidth media.

It is a further object of this invention to provide an improved technique for transmitting visual images, which images need not be immobile, through narrow bandwidth media, such as telephone lines.

It is a still further object of this invention to provide a technique for transmitting visual images through narrow bandwidth media in such a manner that portions of the picture are not fading while the final portions are being received.

Other objects of the invention will in part be obvious and in part be pointed out hereinafter.

BRIEF DESCRIPTION OF THE INVENTION

According to a broad aspect of the invention there is provided a communication system for transmitting video information through media of restricted bandwidth. A camera, such as a standard TV fast scan camera can be used to convert an optical image to an electrical image. The output signal from the camera is fed to an amplifier which passes electrical information for one complete frame of a picture which is to be transmitted. The output of the amplifier is received by a vidicon type storage tube where the electric image is stored as a frozen single frame. The stored image is read by a slow scan technique and transmitted through narrow bandwidth transmission lines. The slow scan signal of the frozen single frame is received at a remote location and stored electrically on a vidicon type storage tube. This latter slow scan electric image is read at a fast scan rate and repetitiously displayed on a standard TV viewer.

BRIEF DESCRIPTION OF THE DRAWINGS

In the drawings, in which are shown various possible embodiments of my invention.

DESCRIPTION OF THE PREFERRED EMBODIMENT

The invention will now be explained with reference to FIGS. 1 through 5.

Figure 1:
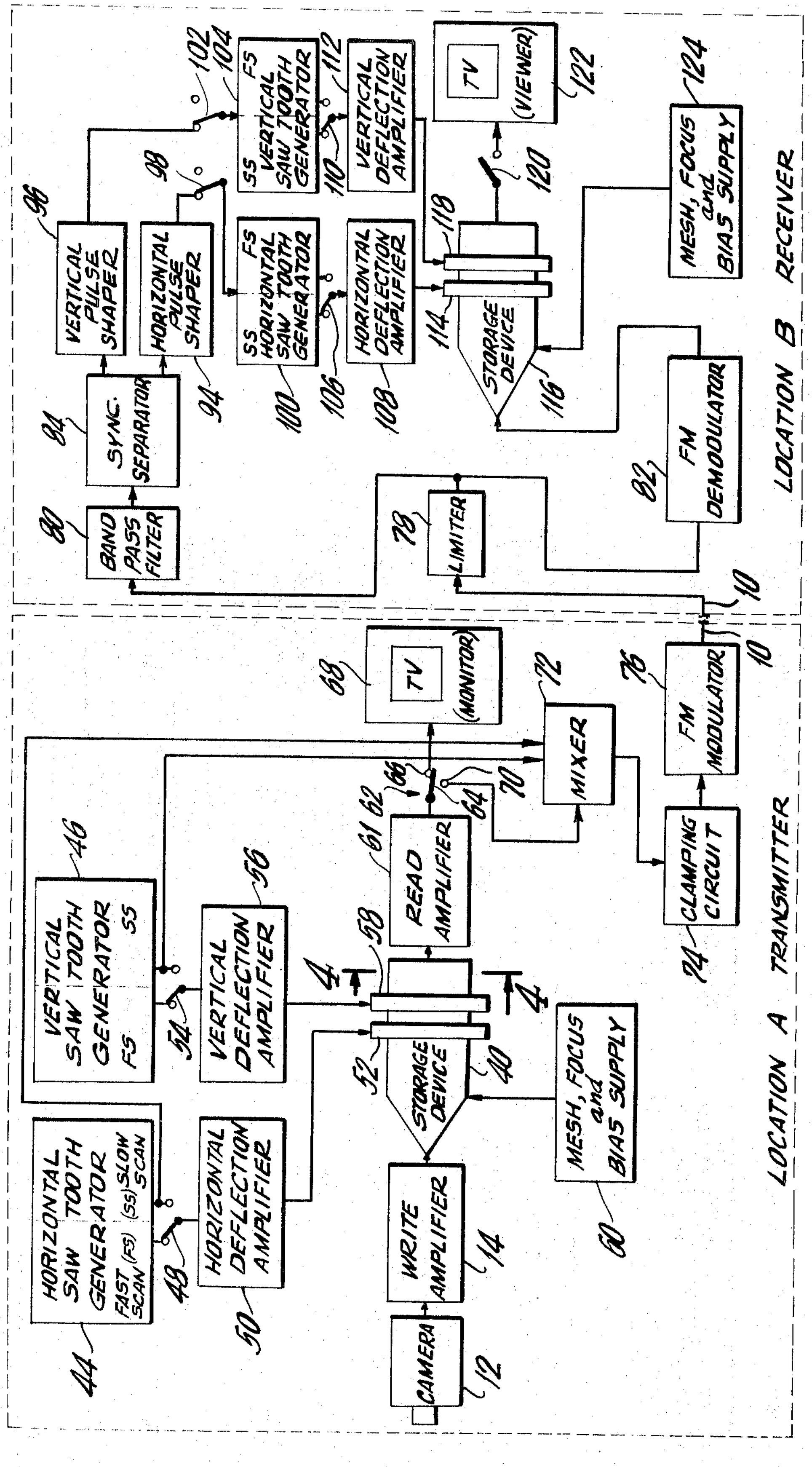
FIG. 1 is a block diagram of the communication system according to the invention.

As shown in FIG. 1, a transmitter is placed at a location A and a receiver is placed at a location B, wherein signals from location A are sent to and received by the receiver at location B via a transmission line 10. It should be understood, of course, that location A can also have a receiver, and location B can also have a transmitter so that signals can also be sent from location B and received at location A. Similarly, of course, proper mode selection switches and logic function circuitry can be provided so that a good deal of the receiver circuitry used at location B could also be utilized in a transmitter at location B, and similarly, a good deal of transmitter circuitry used at the location A could be utilized to provide the necessary receiver circuitry at location A.

Referring specifically to FIG. 1, a camera 12, such as a standard fast-scan TV camera, can be provided so as to convert an optical image to electrical signals which represent an electrical image. This particular fast-scan camera converts a complete optical image to a single frame of electrical signals in one-thirtieth of a second, by providing two interlaced fields, wherein each field consists of 262½ scanned lines. Of course, it should be understood that the invention is not limited to the use of fast-scan cameras and as a matter of fact, other suitable cameras and image converting units, such as flying spot scanners, could be used in place thereof.

The converted electrical signals from the output of camera 12 are routed to a write amplifier 14. This particular write amplifier, in this instance, provides a unique function in that the amplifier is set to pass only two fields or effectively one complete frame, which embodies a complete video image. Once the two fields are amplified, and pass therethrough, the amplifier turns itself off, and passes no further frames of information unless directed to do so.

Figure 2:
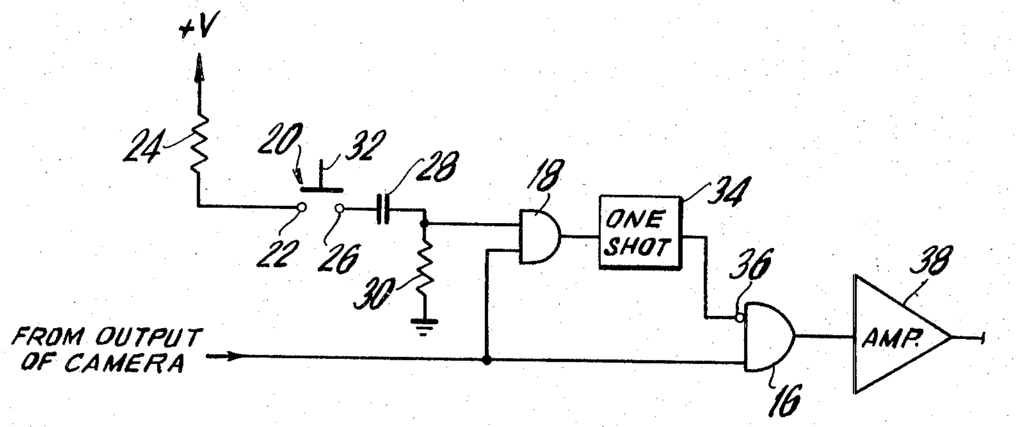
FIG. 2 is a more detailed block diagram of the write amplifier shown as part of the transmitter at location A in FIG. 1.
Figure 4:
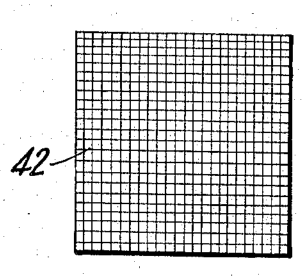
FIG. 4 is an end view of the storage device shown in FIG. 1 depicting the storage mesh or screen for storing the electrical image thereon.

One example of the circuitry required to perform the function of write amplifier 14, is shown in FIG. 2. In this example, electrical signals at the scanning rate of the fast-scan camera 12 are routed from the output of camera 12 to a main input line of an inhibitor gate 16 and a first input of an AND gate 18. A second input of AND gate 18 is connected to the output of a manually activated pulse generator. This pulse generator consists of a push-button assembly 20 which has one contact terminal 22 connected to a source of power V+ via a load resistor 24. The other terminal 26 of the assembly is electrically connected to a pulse differentiator which consists of a capacitor 28 having one terminal electrically connected to terminal 26 and the other terminal electrically connected to the second input of AND gate 18. The other terminal of capacitor 28 is also connected to one terminal of a resistor 30, wherein the other terminal of resistor 30 is electrically connected to circuit ground. The values and time constants of resistor 30 and capacitor 28 are so selected that, when a push-button arm 32 of push-button assembly 20 is depressed, so that electrical contact 22 is electrically connected to electrical contact 26, a pulse of proper amplitude and duration, which varies from between one-thirtieth and one-sixtieth of a second, is applied to the second input terminal of AND gate 18. AND gate 18 is then activated by the leading edge of the first field to appear at the first input of AND gate 18 during the interval when a pulse from the manually activated pulse generator is also applied to the second input terminal of AND gate 18. The signal produced at the output of AND gate 18 triggers a standard one shot multivibrator 34 so that a pulse having a duration of one-thirtieth of a second, or one frame length, is applied from the output of one shot 34 to a control input terminal 36 of inhibitor gate 16. Once this enabling pulse from one shot 34 is applied to control terminal 36 of inhibitor gate 16, signals from the output of camera 12 are allowed to pass through inhibitor gate 16 and to a standard amplifier 38, which amplifier produces amplified electrical signals at its output thereof for the duration of the enabling pulse applied to control input terminal 36 of inhibitor gate 16, so that effectively the write amplifier will pass only one frame length of electrical signals, and then turn off, regardless of the length of time that push-button arm 32 is depressed. No further signals from the output of camera 12 will be passed by write amplifier 14, unless a manual command from push-button assembly 20 is given.

The output from write amplifier 14 is then fed to the input of a storage device 40. Storage device 40, in this instance, is a vidicon type storage tube which is capable of storing electrical signals in the form of an electrical image for at least 10 seconds. The storage tube used in this instance may even by able to store the electrical image therein for at least 30 days, and possibly longer, of no electrical signals are being sent from the output thereof. If electrical signals are being sent from the output thereof, this particular storage tube does have the capability of retaining the electrical image therein for approximately 10 minutes before the image is bled off. The electrical image, in fact, is placed upon and stored on a storage screen or mesh 42 (shown in FIG. 4) within the storage device, wherein the electrical charge placed upon the storage mesh is properly positioned with the aid of deflection circuitry. The deflection circuitry provides proper horizontal and vertical sweep signals at the identical fast scan rate of camera 12, so that the electrical image positioned on storage screen or mesh 42 in electrical terms represents the converted visual image to be transmitted. By way of example, the deflection circuitry includes a sawtooth generator 44 for the horizontal deflection circuits, and a sawtooth generator 46 for the vertical deflection circuits.

Both sawtooth generators are identical type sweep generator circuits commonly found in texts such as "Wave Generation and Shaping" by Strauss, published by McGraw Hill, wherein the actual frequency of each generator is determined by the selection of critical charging capacitors. Horizontal sawtooth generator 44, in this instance, has a sweep repetition rate of 15,750 Hz., while vertical sawtooth generator 46 has a sweep repetition rate of 60 Hz, which respective frequencies are standard fast scan rates that are compatible with that of camera 12, so as to ensure that the electrical image established on storage screen or mesh 42 is virtually identical to the converted optical image seen by camera 12.

The signal output from horizontal sawtooth generator 44 is shown passing through a switch contact 48 to a horizontal deflection amplifier 50. Amplifier 50 is a standard amplifier unit. The signal output of amplifier 50 is then applied directly to a horizontal deflection coil 52 of storage device 40. The signal output of vertical sawtooth generator 46 is applied through a switch contact 54 to a vertical deflection amplifier 56. Vertical deflection amplifier 56 is also a standard amplifier unit. The output of amplifier 56 is then applied to a vertical deflection coil 58 of storage device 40. Thus, in this manner, the fast scan image from camera 12 will be established on storage screen or mesh 42.

Power to the storage device for mesh, focussing, and bias purposes is shown as being supplied from supply box 60. Focussing, mesh and bias supplies, and other power levels are, of course, adjusted and adjustable depending upon the actual scanning rates which are applied to the deflection coils of the storage device.

The output of storage device 40 is directly applied to a read amplifier 61 which amplifier again is a standard amplifier unit. Amplifier 61 ensures that the sensed output of the storage device is at the proper voltage level. The output of read amplifier 61 is then applied to a mode switch 62. When a contact arm 64 of mode switch 62 is in contact with a contact terminal 66, the output of read amplifier 61 is directly routed to a TV monitor 68, which monitor may be a standard TV receiver. When mode switch 62 is in this position the converted visual image from camera 12 is immediately and directly seen on the screen of TV monitor 68. Thus, if one were not satisfied with either the quality of the image or the image itself, an erase signal could be applied directly to the storage mesh or screen (see FIG. 4) so as to erase the image, and have another image from camera 12 routed through write amplifier 14 on to storage mesh or screen 42 of storage device 40.

Now, once one is satisfied with the image that is stored by storage device 40 and monitored on TV monitor or receiver 68, contact arm 64 of mode switch 62 is moved to engage a contact terminal 70, so as to place the transmitter in the transmitting mode, whereupon the stored signal is ready to be routed to the receiver at location B. When mode switch 62 is switched to the transmit mode, the repetition rate or sweep frequency of horizontal and vertical sawtooth generators 44 and 46 are changed to a slow scan rate, so that the actual transmitted electrical signal will be a slow scan TV signal. The slow scan frequency rate of horizontal sawtooth generator 44 is 15 Hz., and the slow scan frequency of vertical sawtooth generator 46 is one-eighth Hz. This switch in frequencies from fast scan to slow scan rates can be simply accomplished by a change in the ganging of the charging capacitors within each of the generators. This is symbolically shown by switches 48 and 54 in FIG. 1, wherein when the switches are in the left position, the output of the generators are at the fast scan rates, and when the switches are moved to the right position, the output of the generators would be switched to the slow scan frequency rates. Thus, when the generators are switched to the slow scan frequency rates, slow scan sweep signals are applied to the appropriate deflection coils of storage device 40, and slow scan electrical signals are routed from the output of the storage device through read amplifier 61, switch 62, via contact 70 to a sync inserter or mixer 72. Meanwhile, slow scan signals from generators 44 and 46 are also applied to mixer 72. Mixer 72 can, of course, be any standard amplifier wherein a multiple of input signals are applied thereto to produce a composite thereof at the output of the amplifier.

The composite signal at the output of mixer 72 is then applied to a clamping circuit 74 which does nothing more than ensure that the signals from the output of mixer 72 fall between a specific voltage range, which range, in this instance, is 4 to 8 volts. Such clamping circuits are, of course, very well known, and could be easily designed by one using the techniques described in "Pulse and Digital Circuits" by Millman and Taub, published by McGraw Hill. The output of clamping circuit 74 is then directly fed to an FM modulator 76 which can be the same as described in my copending application supra as a Signetics Encoder 566, supplied by Signetics. Of course, other standard FM modulators described in text and literature could be used in place thereof.

The composite video signal which contains slow scan horizontal and vertical sync pulse information is then fed from the output of FM modulator 76 at location A through transmission line 10, which, of course, can be a narrow bandwidth line such as telephone line, to a limiter circuit 78 at location B. Limiter 78 can be any standard saturation amplifier or diode clamping circuit which is capable of rejecting any AM signals introduced into the FM modulated signal received by the limiter. The received output signal from limiter 78 is simultaneously routed to a band-pass filter 80, and an FM demodulator 82. In this instance band-pass filter 80 has a resonant frequency response of 1,200 Hz plus or minus 50 Hz, so as to pass only the slow scan horizontal and vertical sync pulse portions of the composite signal received by limiter 78.

Figure 3:
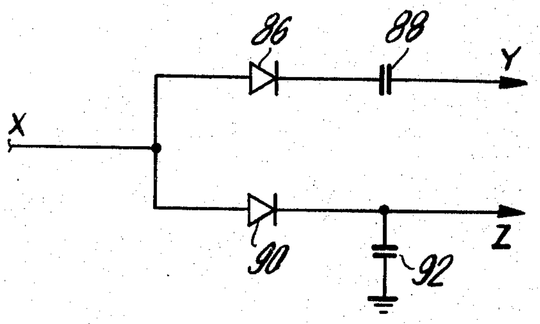
FIG. 3 is a simple circuit diagram of the sync separator shown in the receiver at location B in FIG. 1.
Figure 5:
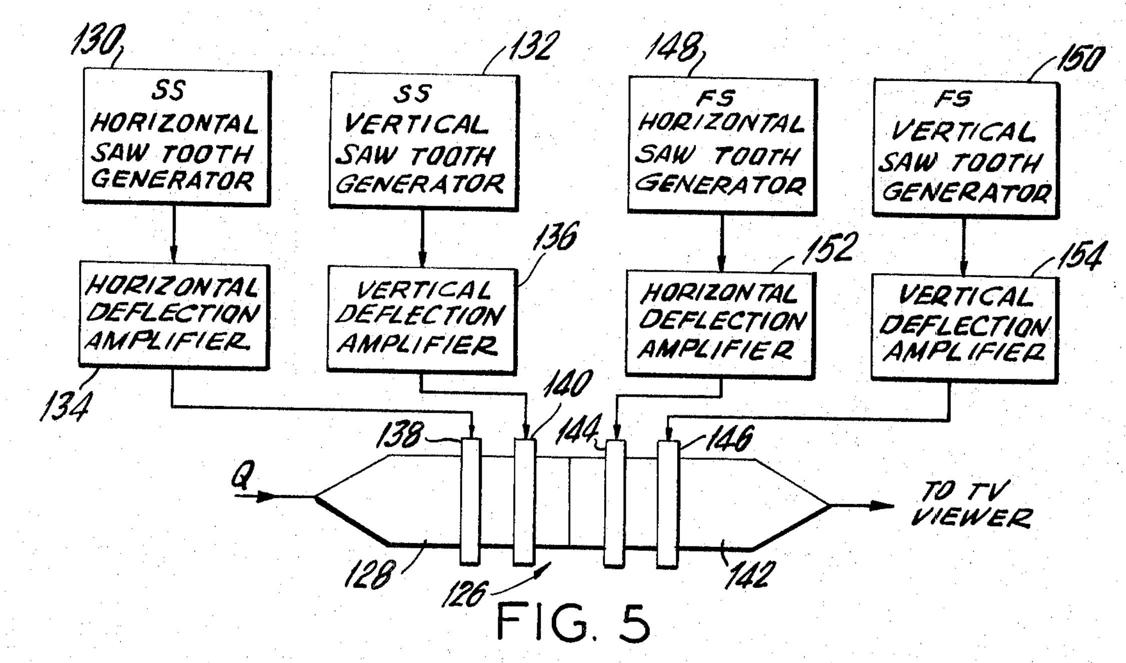
FIG. 5 is a block diagram of a double ended storage device and associated deflection circuitry which is necessary to allow immediate readout as the slow scan signals are received.

The filtered sync pulses pass from the output of band-pass filter 80 to a sync separator 84, which separator separates the horizontal and vertical sync pulses. A typical sync separator is shown in FIG. 3, wherein the sync signals are introduced at an input terminal X of the sync separator, and the high repetition rate horizontal sync pulses pass through a diode 86 and a coupling capacitor 88 to a terminal Y. The lower repetition rate vertical sync pulses pass through a diode 90 to an output terminal Z. The high repetition rate sync pulses are filtered to circuit ground via a filtering capacitor 92 and do not reach output terminal Z. A high impedance choke, not shown, could be placed in series with capacitor 92 so as to prevent the shorting out of the high repetition rate horizontal sync pulses. The lower repetition rate sync pulses are blocked by coupling capacitor 88, so as not to pass to terminal Y. By way of example only, the anodes of diodes 86 and 90 are connected to terminal X so that the sync separator passes positive pulse levels.

The separated high repetition rate horizontal sync pulse is routed from terminal Y of sync separator 84 to a horizontal pulse shaper 94, and the lower repetition rate vertical sync pulses are routed from terminal Z of sync separator 84 to a vertical pulse shaper 96. Pulse shapers 94 and 96 are standard amplifiers whose gain are sufficient to drive the amplifiers into saturation, so that the output pulse levels are relatively constant and the pulse rise times are relatively very fast. The output signals from horizontal pulse shaper 94 pass through a selector switch 98 to a horizontal sawtooth generator 100 while the output pulses from vertical pulse shaper 96 pass through a selector switch 102 to a vertical sawtooth generator 104. While the receiver is in this mode, i.e., mode to receive and store slow scan signals, the repetition rate of horizontal sawtooth generator is 15 Hz. (slow scan rate), and the repetition rate of the vertical sawtooth generator is one-eighth Hz (slow scan rate). In this instance, the pulses from the horizontal and vertical pulse shapers are used to trigger the respective horizontal and vertical sawtooth generators and sync these generators to the actual slow scan sweep rates of the horizontal and vertical sawtooth generators of the transmitter at location A.

The synchronized slow scan output signals from horizontal sawtooth generator 100 pass through a switch 106 to a horizontal deflection amplifier 108, while the synchronized slow scan output signals from vertical sawtooth generator 104 pass through a switch 110 to a vertical deflection amplifier 112. Horizontal and vertical deflection amplifiers 108 and 112 are virtually identical to their counterparts, previously described, and located within the transmitter at location A. The output signals from horizontal deflection amplifier 108 are than applied to a horizontal deflection coil 114 of a storage device 116, while the output signals from vertical deflection amplifier 112 are applied to a vertical deflection coil 118 of storage device 116. Similarly, storage device 116 can be virtually identical to storage device 40, previously described with respect to the transmitter located at location A.

Meanswhile, the composite video signal, which is applied to FM demodulator 82, is demodulated, and the demodulated slow scan signal is applied to the input of storage device 116. FM demodulator 82 may be any standard demodulator unit which will detect slow scan FM video signals. In this instance, the FM demodulator is a phase locked loop which follows the FM signal. The error signal which is created is the actual detected video signal. In this instance, the specific demodulator used is supplied by the Signetics Corporation, and is known as the "Signetics PLL 565." Thus, the demodulated slow scan video signals from FM demodulator 82 is similarly applied to a storage mesh or screen within storage device 116 at the slow scan rate determined by the horizontal and vertical sweep signals produced by respective horizontal and vertical sawtooth generators 100 and 104, wwhich signals, as previously noted, have been locked in or synchronized to slow scan sweep signals of the transmitter at location A. Thus, in this mode, the receiver is storing the slow scan signal within storage device 116, and a switch 120 at the output of storage device 116 is shown in an open position so as to electrically disconnect the output of storage device 116 from a TV viewer 122. Again, in this instance, the TV viewer may actually be a standard TV receiver.

Once the complete image has been received and stored on the storage mesh or screen of storage device 116, usually 8 seconds from the time transmission begins at the transmitting end, the signal is ready to be reconverted to an optical image, and observed on viewer 122. This is accomplished by changing the mode of the receiver. The mode is changed by opening up switches 98 and 102, and changing the sweep repetition rates of horizontal sawtooth generator 100 to the fast scan rate of 15,750 Hz and that of vertical sawtooth generator to the fast scan rate of 60 Hz. Again, this is internally accomplished as previously described, by changing the value of the timing or charging capacitors within the sawtooth generators. This is symbolically shown in FIG. 1 by moving switch 106 to the right, and connected to the fast scan side of the block 100, and switch 110 to the right and connected to the fast scan side of block 104. Now, fast scan sweep signals are being applied to deflection coils 114 and 118, and once switch 120 is closed, a standard fast scan TV signal is effectively routed from the output of storage device 116 to TV viewer 122, and then conventionally converted to a video signal. Again, as previously noted, mesh, focussing and biasing supplies for storage device 116 are supplied to storage device 116 by power block 124. The actual power levels, of course, must be adjusted, depending upon the scanning rates of the signals applied to the deflection coils of the storage device.

It may be desired, in some instances, to have the video signals seen on TV viewer 122 simultaneously as the slow scan signals are being received by the storage device. This can be accomplished by replacing storage device or tube 116 with a double-ended vidicon type storage tube 126, shown in FIG. 5 wherein slow scan signals are received at an input Q of one end 128 of double-ended storage device 126. A horizontal sawtooth generator 130 and a vertical sawtooth generator 132 produce signals at the slow scan rate, which signals are synchronized to the slow scan signals of the transmitter, as previously described above. The output signals from the horizontal and vertical sawtooth generators are again applied to standard horizontal and vertical deflection amplifiers 134 and 136. The output signals from horizontal deflection amplifier 134 and vertical deflection amplifier 136 are respectively applied to a horizontal deflection coil 138 and a vertical deflection coil 140 on end 128 of storage device 126. These slow scan sweep signals applied to the horizontal and vertical deflection coils allow the slow scan signal from the transmitter to be received and stored on a storage mesh or screen in end 128 of device 126. Now, in this instance, the output from the storage mesh of end 128 is in fact the storage mesh of another end 142 of double-ended storage device 126. End 142 also has a horizontal deflection coil 144 and a vertical deflection coil 146. Now, fast scan sweep signals at a repetition rate of 15,750 Hz are generated by a horizontal sawtooth generator 148. Fast scan sweep signals at the repetition rate of 60 Hz are generated by a vertical sawtooth generator 150. The fast scan output signals from generators 148 and 150 are respectively applied to horizontal and vertical deflection amplifiers 152 and 154. The output sweep signals from horizontal deflection amplifier 152 are then applied to horizontal deflection coil 144, while the fast scan sweep signals from the output of vertical deflection amplifier 154 are applied to vertical deflection coil 146. In this manner, as slow scan signals are being received and stored on the storage mesh or screen of end 128, the storage mesh or screen from the opposite direction and within end 142 of device 126 is scanned at the fast scan rates, so that they can be simultaneously transmitted from the output of end 142 to the TV viewer.

It should be noted that an alternate technique for simultaneously receiving a slow scan signal and visually observing the slow scan signal can be provided by using the retraced time of the slow scan sweep signals to transmit the received storage signals to the TV viewer.

Using the system thus described, it is possible that when attempting to transmit images under adverse conditions, such as poor lighting, it may be possible to successfully transmit weak optical images by operating the system in what may be noted as an enhancement mode. In this mode activating push-button 20 within write amplifier 14, may be successively depressed a number of instances, so that the converted optical image received by camera 12 is repeatedly routed through amplifier 14 and on to the storage mesh of storage device 40, so as to enhance or strengthen the stored electrical image on storage mesh or screen 42, so that finally, when the image is ultimately transmitted to the receiver at location B, a more enhanced or sharper image is actually received on TV viewer 122.

In another variation of the system, by changing the polarity of the signals, a negative image may be produced, wherein, by using simple contact printing and processing, hard copies can be made from the produced negative image.

In a further embodiment of the invention, a tape recorder (not shown) can be placed in parallel with the transmission line at the transmitting or receiving ends, so that the video images may be stored thereon.

Furthermore, by mixing the fast scan signal from storage device 116 at the receiver with an r.f. local oscillator signal, the video signal could actually be radiated and seen on an unused channel of a standard black and white, or color TV set, using well known conventional techniques.

It thus is seen that there is provided a communication system for transmitting video information through media of restricted bandwidth which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having now described the invention what is claimed as new and is desired to be secured by Letters Patent is:

1. A communication system for transmitting video images from a first location to a second location via a transmission line comprising:

A. means for converting a visual image to a series of frames of electrical signals at a fast TV scan rate at the first location;

B. means coupled to said converting means for storing only the signal of a single such frame;

C. means for converting said single frame stored electrical signal to a slow scan TV signal of the single frame;

D. means for receiving said single frame slow scanned TV signal at the second location via the transmission line, said receiving means including;

i. limiter means for eliminating AM signals from the received signal, ii. means for providing FM demodulation of said signal coupled to the output of said limiter, iii. a bandpass filter coupled to the output of said limiter, iv. a sync separator coupled to the output of said bandpass filter, and v. means for generating vertical and horizontal sync pulses coupled to the output of said sync separator;

E. means for storing said single frame received slow scan signal;

F. means for converting the stored single frame received slow scan signal to repetitious signals of said single frame at a fast TV scan rate; and G. means for converting the repetitious fast scan TV signals of said single frame to an optical image corresponding to the visual image.

2. A communication system according to claim 1 wherein said received storing means includes:

another storage tube, said other tube having a storage screen for receiving the slow scanned electrical image, said other storage tube being coupled to the output of said FM demodulating means.

3. A communication system according to claim 2 wherein said other storage tube further includes horizontal and vertical deflection means synchronized to the horizontal and vertical pulses from said sync separator whereby said horizontal and vertical deflection means establishes said slow scan electrical image on the storage screen at the slow scan frequency rate.

4. A communication system according to claim 3 wherein said stored slow scan converting means includes horizontal and vertical deflection means for scanning said received stored slow scan image at the same scanning rate as said camera.

5. A communication system according to claim 4 wherein said stored slow scan converting means further includes a TV receiver for converting the stored received image to the original visual image.

* * * * *